United States Patent [19]

Kremer

[11] Patent Number: 4,828,751

[45] Date of Patent: May 9, 1989

[54] SOLVENT COMPOSITION FOR CLEANING SILICON WAFERS

[75] Inventor: Paul W. Kremer, Gainesville, Fla.

[73] Assignee: PCR, Inc., Gainesville, Fla.

[21] Appl. No.: 90,661

[22] Filed: Aug. 28, 1987

[51] Int. Cl.[4] .......................... C09D 9/00; C11D 7/50; C23G 5/02

[52] U.S. Cl. .................................... 252/171; 252/170; 252/153; 252/162; 252/67; 134/40; 134/42; 134/39

[58] Field of Search ............... 252/170, 171, 153, 162, 252/67; 134/40, 42

[56] References Cited

U.S. PATENT DOCUMENTS 3,509,061 4/1970 Zisman et al. ...................... 252/171
3,957,672 5/1976 Zisman et al. ...................... 252/171
4,303,558 12/1981 Hay .................................... 252/548
4,465,610 8/1984 Enjo et al. ........................... 252/67
4,530,776 7/1985 Hisamoto et al. .................. 252/153

FOREIGN PATENT DOCUMENTS 2188059 9/1987 United Kingdom .

*Primary Examiner*—Paul Lieberman
*Assistant Examiner*—Ronald A. Krasnow
*Attorney, Agent, or Firm*—Hedman, Gibson, Costigan & Hoare

[57] ABSTRACT

There is provided an improved solvent especially adapted for cleaning silicon wafers and consisting essentially of a haloalkylhydrocarbon and a partially fluorinated alcohol. This solvent provides excellent cleaning and drying of the wafer.

18 Claims, No Drawings

SOLVENT COMPOSITION FOR CLEANING SILICON WAFERS

This invention relates, as indicated, to an improved solvent composition especially useful in cleaning and drying silicon wafers.

BACKGROUND OF THE INVENTION AND PRIOR ART

In the production of integrated circuits, "chips" formed of silicon metal and on which are etched intricate circuits, are an essential component. The silicon wafers are carefully cut from a single crystal of silicon. These wafers are about 2" in diameter. In the processing of these wafers they become contaminated with dirt, dust, grease, etc. Before further processing into the final "chips" the wafers must be carefully cleaned.

In the semiconductor industry, wafers are rinsed in water after many process steps and, as indicated, then carefully cleaned and dried prior to the continuation of the fabrication process. At the present time, the silicon wafers are placed in a "boat" and dipped or sprayed with deionized water. The boats are subsequently loaded into a high speed centrifuge where the wafers are spin-dried. Recent technology has made use of vapor dryers utilizing isopropyl alcohol as a drying agent. The method creates a significant amount of waste over the period of a month, for example, and also a significant fire hazard.

It was desired, therefore, to develop a solvent system that was easily recovered and recycled, had excellent cleaning properties, had a convenient boiling point in the range of from about 40° to 120° C. and a very high, or no flash point. It was found that these criteria were met with a solvent composition which is a mixture of a fluorocarbon or chlorofluorocarbon, and a partially fluorinated alcohol. The system is unique especially for cleaning silicon wafers in that the acidic nature of the alcohol provides excellent cleaning, and the fluorocarbon or fluorochlorocarbon aids in drying the wafer without leaving any residue. The vapor may be recovered, condensed and reused.

The compositions hereof are used in the usual manner of rinsing in a boat or in a hot vapor system and then heating to a temperature sufficient to volatilize the solvent. Centrifuging may be used, but is unnecessary.

Reference may be had to Japanese Kokais Nos. 61/255977 and 58/122980. The former thermally stabilizes a working medium including a hydrocarbon (e.g., methane, ethane, propane, n-butane, isobutane, n-pentane, isopentane, n-hexane or n-heptane,) alcohol, e.g., methanol, ethanol, 2,2,2-trifluoroethanol or 2,2,2,3,3-pentafluoropropanol, a mixture of fluorinated alcohol and water or ammonia, 4–8C perfluoroalkane, or freon, an azeotropic mixture of $CCl_2F_2$ and $CHF_2—CH_3$ or azeotropic mixture of $CHClF_2$ and $CClF_2CF_3$. To the working medium is added phosphine sulfide and glycidyl ether and optionally lubricating oil. This composition is used to treat steel, aluminum, aluminum alloy, or brass.

The latter Japanese Kokai teaches a processing fluid for use in a heat transfer device of a closed fluid cycling system with evaporation and condensing sections. The processing fluid is composed of trifluoroethanol and contains up to a maximum of 15% water. The fluid used contains water, ethanol, freon, mercury, cesium, pentane and heptane.

Each of these compositions is used for a different purpose and in a different manner.

BRIEF STATEMENT OF THE INVENTION

Briefly stated, the present invention is in a nonaqueous solvent composition especially useful for cleaning and drying silicon wafers. The solvent consists essentially of (a) from about 30 to about 90 parts by weight of a haloalkylhydrocarbon containing from 1 to 10 carbon atoms, and (b) from about 10 to about 70 parts by weight of a partially fluorinated alcohol containing from 2 to 4 carbon atoms. Normally, components (a) and (b) total 100 parts, although insignificant amounts of volatile other components may be present so long as they do not adversely affect the ability of the solvent to achieve its intended purpose. The amounts of such materials are generally less than 5 parts in 100 parts and preferably less than 0.1 part in 100 parts.

DETAILED DESCRIPTION OF THE INVENTION

As indicated above, the solvent compositions of the present invention contain two essential ingredients. One of these (hereinafter referred to as component (a)) is a haloalkylhydrocarbon containing from 1 to 12 carbons atoms. For most purposes, these haloalkylhydrocarbons are perhalogenated, that is, all the hydrogen atoms are replaced with a halogen, preferably fluorine and/or chlorine. Thus, mixed fluorochlorohydrocarbons are contemplated hereby.

The second essential component (hereinafter referred to as component (b)) is a relatively low molecular weight partially fluorinated alcohol containing from 2 to 4 carbon atoms. These alcohols contain carbon, hydrogen, fluorine and oxygen as the only elements therein.

Component (a) is present in the solvent compositions hereof in an amount of from about 30 parts to about 90 parts by weight per 100 parts of solvent. For most purposes, component (a) is the major component although as will be seen from the examples below, it may be the minor component.

Component (b) is the component primarily responsible for the cleaning action of the solvent compositions hereof. It is generally present in an amount of from about 10 to about 70 parts by weight based on 100 parts of solvent. For most purposes, component (b) is the minor component although as will be seen from the specific examples below, it may be the major component.

Components (a) and (b) are normally and preferably single compounds. However, it is contemplated hereby that two or more materials qualifying as component (a) ingredients, and two or more materials qualifying as component (b) may be used in place of the single compound. Thus, the solvent compositions hereof may have components (a), (a') and (b); (a), (a'), (b) and (b'); (a), (b), and (b'), as well as the preferred (a) and (b), the prime (') indicating another member of the same class.

The compositions of (a) and (b) may be standing absorb minor amounts of moisture not to exceed about 5 parts by weight. Such insignificant amounts of moisture are not deleterious to the compositions hereof, and may, although it is not recommended, be added in amounts up to 1 parts or 2 parts per 100 parts of solvent prior to use. The compositions initially are preferably nonaqueous. Other ingredients in very minor amounts, less than 5 parts/100 parts by weight such as low boiling alcohols, ethers, ketones and esters may also be included.

Both components (a) and (b) desirably contain fluorine. Component (a) may, therefore, have the general formula:

$$C_nF_{2n+2-x}Cl_x$$

wherein n is a whole number from 1 to 12, and x is a number from 0 to 2n. Preferably, n is from 2 to 6, and x is preferably from 0 to 4.

Specific examples of component (a) include, but are not limited to the following:

Trichlorofluoromethane
Dichlorodifluoromethane
Chlorotrifluoromethane
Tetrafluoromethane
1,1,2,2-tetrachloro-1,2-difluoroethane
1,1,2-trichloro-1,2,2-trifluoroethane
1,2-dichloro-1,1,2,2-tetrafluoroethane
Chloropentafluoroethane
Hexafluoroethane
1,1,1,3-tetrachloro-2,2,3,3-tetrafluoropropane
1,1,1-trichloro-2,2,3,3,3-pentafluoropropane
Octafluoropropane
tetrachloroperfluorobutane
1,1-dichlorodecafluoropentanes
1,1,1-trichloroundecafluorohexanes
Dodecafluorocyclohexane
Tetradecafluorohexanes
Perfluoroheptanes
Perfluorohexanes
Perfluorooctanes
Perfluorodecanes
Perfluorododecanes Specific examples of partially fluorinated alcohols contain carbon, hydrogen, fluorine and oxygen, the latter atom as part of an —OH group, and include:

Trifluoroethanol
3,3,3-trifluoropropanol
4,4,4-trifluorobutanol
2-fluoroethanol
2,3,3,3-tetrafluoropropanol
2,2,3,3-tetrafluoropropanol
4-fluorobutanol
2,2-difluoropropanol
1,1-difluoroethanol-2
3,3-difluoropropanol
1,1-difluoropropanol-3
3-fluoropropanol
1-monofluoropropanol-3
2,2,3,3,3-Pentafluoropropanol
1,1,1,2,2-Pentafluoropropanol-3

As above indicated, components (a) and (b) are simply mixed together to formulate the solvent compositions of the present invention. Typical examples of such solvent compositions are:

| | |
|---|---|
| EXAMPLE 1 | |
| Perfluoroheptane | 70 parts |
| Trifluoroethanol | 30 parts |
| EXAMPLE 2 | |
| 1,1,2-trichloro-1,2,2-trifluoroethane | 30 parts |
| Trifluoroethanol | 70 parts |
| EXAMPLE 3 | |
| 1,1,2-trichloro-1,2,2-trifluoroethane | 50 parts |
| Trifluoroethanol | 50 parts |
| EXAMPLE 4 | |
| 1,1,2-trichloro-1,2,2-trifluoroethane | 90 parts |
| Trifluoroethanol | 10 parts |
| EXAMPLE 5 | |
| Tetrochloroperfluorobutane | 30 parts |
| 3,3,3-trifluropropanol | 70 parts |
| EXAMPLE 6 | |
| Tetrachloroperfluorobutanes | 60 parts |
| Trifluoroethanol | 40 parts |
| EXAMPLE 7 | |
| Tetrachloroperfluorobutanes | 90 parts |
| Trifluoroethanol | 10 parts |
| EXAMPLE 8 | |
| Perfluorohexane | 70 parts |
| 3,3,3,-trifluoropropanol | 30 parts |
| EXAMPLE 9 | |
| Perfluorohexanes | 45 parts |
| 2,2,3,3-tetrafluoropropanol | 55 parts |
| EXAMPLE 10 | |
| Perfluorohexanes | 10 parts |
| Trifluoroethanol | 90 parts |
| EXAMPLE 11 | |
| Perfluorodecanes | 60 parts |
| Trifluoroethanol | 40 parts |
| EXAMPLE 12 | |
| Perfluoroheptanes | 70 parts |
| Trifluoroethanol | 20 parts |
| 3,3,3-trifluoropropanol | 10 parts |
| EXAMPLE 13 | |
| Perfluoroheptanes | 35 parts |
| Perfluorohexanes | 35 parts |
| Trifluoroethanol | 30 parts |
| EXAMPLE 14 | |
| Tetrachloroperfluorobutane | 25 parts |
| Perfluorohexanes | 25 parts |
| 3,3,3-trifluoropropanol | 20 parts |
| Trifluoroethanol | 30 parts |
| EXAMPLE 15 | |
| Trifluoroethyltrifluoroacetate | 0 to 5 parts |
| Perfluoroheptane | 70 parts |
| Trifluoroethanol | 30 parts |
| EXAMPLE 16 | |
| Perfluoroheptane | 70 parts |
| 2,2,3,3,3-tetrafluoropropanol | 30 parts |
| EXAMPLE 17 | |
| Perfluoroheptane | 80 parts |
| 2,2,3,3,3-pentafluoropropanol | 20 parts |

The foregoing examples are illustrative of the manner of composing the compositions of the present invention. The ingredients are generally mutual solvents for each other and hence no special techniques are involved in mixing the proper proportions of the components. The compositions are generally stable and, if necessary may be heated slightly to aid in dissolution of the ingredients. and to prevent stability in use.

What is claimed is:

1. A solvent composition useful for cleaning silicon wafers consisting essentially of (a) from about 30 parts to about 90 parts by weight of a perhalogenated haloalkylhydrocarbon containing from 5 to 12 carbon atoms and (b) from about 10 to about 70 parts by weight of a partially fluorinated alcohol containing from 2 to 4 carbon atoms, the total of components (a) and (b) being about 100 parts by weight.

2. A composition as defined in claim 1 which is water free at the time of use.

3. A solvent composition as defined in claim 1 wherein the solvent composition has a boiling point in the range of from 40° to 120° C.

4. A solvent composition as defined in claim 1 wherein component (a) is a fluoroalkylhydrocarbon.

5. A solvent composition as defined in claim 1 wherein component (a) is a fluorochloroalkylhydrocarbon.

6. A solvent composition as defined in claim 4 wherein the fluoroalkylhydrocarbon is perfluoroheptane.

7. A solvent composition as defined in claim 4 wherein the fluoroalkylhydrocarbon is perfluorohexane.

8. A solvent composition as defined in claim 1 wherein the partially fluorinated alcohol in trifluoroethanol.

9. A solvent composition as defined in claim 1 wherein the partially fluorinated alcohol is 3,3,3-trifluoropropanol.

10. A solvent composition as defined in claim 1 wherein the partially fluorinated alcohol is 2,2,3,3,3-pentafluoropropanol.

11. A solvent composition as defined in claim 1 wherein the partially fluorinated alcohol is a partially fluorinated n-butanol.

12. A solvent composition as defined in claim 1 wherein component (a) is perfluorohexane and component (b) is 3,3,3-trifluoropropanol.

13. A solvent composition as defined in claim 1 consisting of (a) 70 parts of perfluoroheptane and (b) 30 parts of trifluoroethanol.

14. A solvent composition as defined in claim 1 consisting of (a) 30 parts of perfluorohexanes and (b) 70 parts of partially fluorinated n-propanol.

15. A solvent composition as defined in claim 1 wherein the partially fluorinated alcohol is 2,2,3,3-tetrafluoropropanol.

16. A solvent composition as defined in claim 1 wherein component (a) is a perfluorododecane.

17. The method of cleaning and drying semiconductor wafers which comprises the steps of rinsing the wafer with a solvent consisting essentially of (a) from about 30 to about 90 parts by weight of a haloalkylhydrocarbon containing from 5 to 12 carbon atoms and (b) from about 10 to about 70 parts by weight of a partially fluorinated alcohol containing from 2 to 4 carbon atoms, the total of components (a) and (b) being about 100 parts by weight; and heating the solvent coated wafer to a temperature sufficient to volatilize the solvent.

18. A solvent composition useful for cleaning silicon wafers consisting essentially of from about 30 parts to about 90 parts by weight of perfluoroheptane and from about 10 to about 70 parts by weight of trifluoroethanol, the total of the said components being about 100 parts by weight.

* * * * *

UNITED STATES PATENT AND TRADEMARK OFFICE

CERTIFICATE OF CORRECTION

PATENT NO. : 4,828,751

DATED : May 9, 1989

INVENTOR(S) : Paul W. Kremer

It is certified that error appears in the above-identified patent and that said Letters Patent is hereby corrected as shown below:

Col. 6, line 29 should read as follows:

--19. A method as defined in claim 17 wherein the rinsing step is carried out in a hot vapor system.--

Signed and Sealed this

Eleventh Day of June, 1991

*Attest:*

HARRY F. MANBECK, JR.

*Attesting Officer*

*Commissioner of Patents and Trademarks*